Patented Sept. 17, 1929

1,728,225

UNITED STATES PATENT OFFICE

PAUL C. BOWERS, OF PENNS GROVE, NEW JERSEY, ASSIGNOR TO E. I. DU PONT DE NEMOURS & COMPANY, OF WILMINGTON, DELAWARE, A CORPORATION OF DELAWARE

PROCESS OF PURIFYING PHTHALIC ANHYDRIDE

No Drawing. Application filed October 27, 1922. Serial No. 597,417.

This invention relates to the purification of phthalic anhydride, and particularly the crude phthalic anhydride which has been produced by the vapor phase oxidation of naphthalene in the presence of a catalyst, and comprises heating the phthalic anhydride with a condensing agent to convert volatile impurities into non-volatile ones, so that the phthalic anhydride itself can be recovered in a pure state by vaporization and subsequent condensation.

I have discovered that the volatile impurities such as the quinones or quinonic bodies which are ordinarily present in crude phthalic anhydride, are readily converted by condensing agents into relatively non-volatile substances, and that the phthalic anhydride can then be separated from these non-volatile substances by vaporization. As typical condensing agents for this purpose there may be mentioned anhydrous zinc chloride, anhydrous ferric chloride, sodium acid sulphate, sodium (or other alkali-metal) hydroxide, and mono-sodium phosphate.

The new process is applicable to the purification of phthalic anhydride either by distillation under reduced pressure or by sublimation.

If the crude phthalic anhydride is subjected to distillation, either at atmospheric pressure or under vacuum without the presence of one of the condensing agents mentioned, the product, although improved by distillation, shows some color, either pink, yellow or gray, in the molten condition, or when allowed to solidify in bulk, even though it may appear perfectly white when ground. If, however, the crude phthalic is distilled in the presence of a small amount of one of the above-mentioned condensing agents, the distilled product is almost or entirely free from color either when molten or when allowed to solidify in compact form. It would be difficult to determine quantitatively the difference between the two distilled products, but the color which shows in the product distilled without a condensing agent also causes difficulty in certain operations which involve a reaction with phthalic anhydride.

The process should preferably be carried out about as follows: The crude phthalic anhydride is melted and agitated. The condensing agent is added in amount sufficient to hold back the impurities, generally 0.25 to 1.0% of the weight of the crude. The treated crude material is (1) either distilled (or sublimed) directly; or is (2) first heated, with agitation, preferably to about its boiling point at atmospheric pressure, the crude phthalic anhydride transferred into the still or sublimer, and distillation or sublimation performed at either atmospheric or reduced pressure.

The process may be further illustrated by the following examples, to which, however, the invention is not limited. (The parts are by weight.)

Example #1: 100 parts of crude phthalic anhydride are melted. The melt is agitated and 0.25 parts of sodium hydroxide are added. With continued agitation the melt is heated to 284.5° C. The agitation is stopped and the melt is transferred into a still and distilled under reduced pressure (1-2 inches mercury). The distillate is water-white and no fractionation is required.

Example #2: Anhydrous ferric chloride is used in place of sodium hydroxide, as in Example #1. The procedure is the same.

Example #3: Anhydrous zinc chloride is used in place of sodium hydroxide, as in Example #1. The procedure is the same.

Example #4: Acid sodium sulfate is stirred into the melted phthalic anhydride in a still and this treated crude distilled directly from the acid sodium sulfate.

Example #5: Mono-sodium phosphate is stirred into the melted phthalic anhydride in a still and this treated crude distilled directly from the acid sodium.

Although the conditions set forth in the above specific examples are considered preferable, it will be understood that various changes may be made in these conditions of operation; thus, after the condensing agent is added to the crude phthalic anhydride, the mixture can be heated to a temperature substantially less than its boiling point until condensation of the volatile impurities is completed. In some cases it will be advantageous to allow the heated molten mass to stand until at least a part of the impurities have settled out, before conveying the phthalic anhydride to the still or sublimer.

In place of the particular condensing agents specified above there may be employed as condensing agents various other metal salts, acids, alkalies, and chlorides of metalloids, without departing from the scope of my invention.

I claim:

1. The process of purifying phthalic anhydride containing impurities such as are formed in the catalytic vapor phase oxidation of naphthalene, which comprises subjecting said impure phthalic anhydride while in a molten condition to the action of an alkali-metal hydroxide to render the volatile impurities non-volatile, and separating the phthalic anhydride by vaporization from the resulting non-volatile substances.

2. The process of purifying crude phthalic anhydride containing quinonic impurities, which comprises mixing the crude anhydride with an alkali metal hydroxide, and heating the mixture to vaporize the phthalic anhydride from the relatively non-volatile impurities.

3. The process of purifying crude phthalic anhydride containing quinonic impurities, which comprises heating the impure anhydride with a condensing agent capable of rendering the impurities relatively less volatile than the phthalic anhydride, such agent being selected from the group including alkali-metal hydroxides, metallic chlorides and alkali-metal acid salts of polybasic mineral acids, thereby rendering the volatile quinonic impurities relatively non-volatile and separating the phthalic anhydride from the relatively non-volatile impurities by fractional vaporization.

4. In the process of purifying phthalic anhydride containing impurities such as are formed in the catalytic vapor phase oxidation of naphthalene, the step which comprises heating said impure phthalic anhydride with a condensing agent capable of rendering the impurities relatively less volatile than the phthalic anhydride, such agent being selected from the group including alkali-metal hydroxides, metallic chlorides and alkali-metal acid salts of polybasic mineral acids.

5. The process set forth in claim 2 in which the proportion of alkali metal hydroxide employed is from about 0.25 to 1% of the phthalic anhydride.

6. In the process of purifying phthalic anhydride containing impurities such as are formed in the catalytic vapor phase oxidation of naphthalene, the step which comprises heating said impure anhydride with an alkali metal hydroxide.

In testimony whereof I affix my signature.

PAUL C. BOWERS.